Patented Aug. 2, 1927.

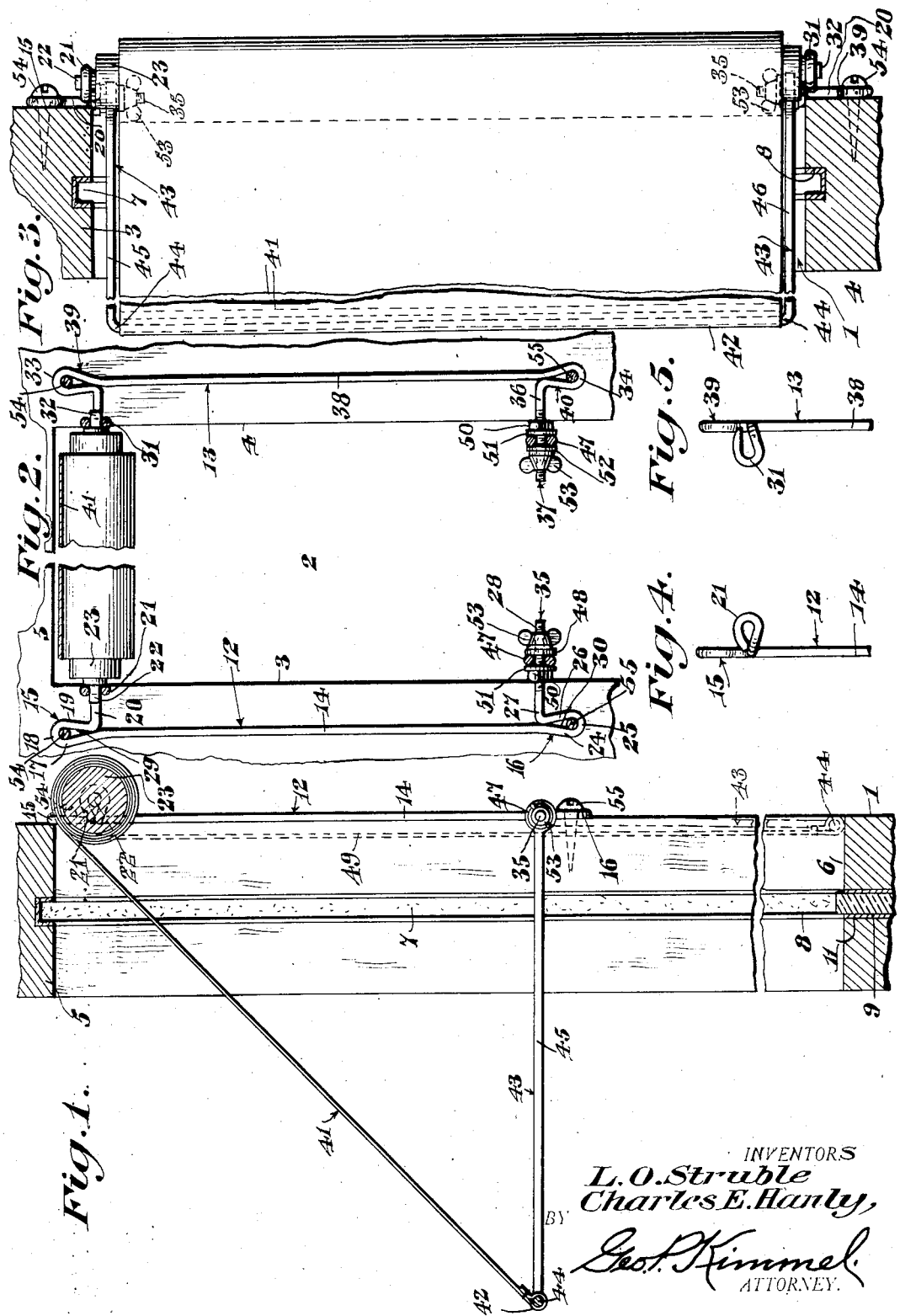

1,637,971

UNITED STATES PATENT OFFICE.

LEO O. STRUBLE AND CHARLES E. HANLY, OF SALINA, KANSAS.

AUTOMOBILE AWNING.

Application filed March 1, 1927. Serial No. 171,809.

This invention relates to an adjustable awning, blind or shade, hereinafter termed an awning, and designed primarily for use in connection with doors and windows of an automobile body of the closed car type, but it is to be understood that an awning, in accordance with this invention, can be set up of any desired size for use, not only in connection with the doors and windows of an automobile body of the closed car type, but also in connection with windows and doors of buildings, or for any other purposes for which it is found applicable, and the invention has for its object to provide, in a manner as hereinafter set forth, an awning including a flexible body portion capable of being conveniently adjusted to and held in any desired angular position to exclude sun or heat and for ventilating purposes, and further whereby said flexible body can be adjusted to and held in a vertical position to provide the function of a vertically disposed shade.

Further objects of the invention are to provide, in a manner as hereinafter set forth, an adjustable awning, which is simple in its construction and arrangement, strong, durable, compact, thoroughly efficient in its use, conveniently adjusted, readily installed with respect to the door or window, and comparatively inexpensive to set up.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a side elevation of an awning, in accordance with this invention, showing the adaptation thereof in connection with a window of an automobile body of the closed type and with the window in vertical section.

Figure 2 is a front elevation, partly in section, of the awning when raised or closed and further illustrating the same connected to an automobile body of the closed type.

Figure 3 is a fragmentary view, in sectional plan, illustrating an awning, in accordance with this invention, installed with respect to an automobile body of the closed type.

Figure 4 is a side elevation, broken away, of one of the combined support and pivot elements of the awning, and Figure 5 is a view similar to Figure 4 of the other combined support and pivot element of the awning.

An awning, in accordance with this invention is illustrated by way of example in connection with the window of an automobile body, of the closed type, but it is to be understood that an awning body, in accordance with this invention can be set up with the doors of the automobile body, or with the doors or windows of a building, or for any purposes for which it is found applicable, and referring to the drawings 1 denotes an automobile body of the closed type, provided with a window opening 2. The sides of the opening 2 are indicated at 3, 4, the top at 5 and the bottom at 6. As illustrated the window is closed by a vertically shiftable panel, formed of transparent material, and which is indicated at 7. The panel 7 travels in grooves 8 formed in the sides of the window opening or frame and also in a pocket provided in the automobile body 1 and said pocket is indicated at 9. Packing strips 11, as is well known, are provided in the pocket 9 and between which the panel 7 slides. The foregoing construction is well known and no claim is made thereto.

An awning, in accordance with this invention, includes a pair of combined support and pivot elements, referred to generally by the reference characters 12, 13. Each of said elements is constructed from a bar of appropriate length and preferably of cylindrical cross section. The material from which the bar is formed is metal. The elements 12 and 13 are secured to the inner face of the car body 1 adjacent to the sides of the opening 2. The element 12 consists of a vertically disposed intermediate portion 14, an upper end portion referred to generally by the reference character 15 and a lower end portion referred to generally by the reference character 16. The upper end portion 15 includes an upwardly extending and outwardly inclined part 17, which merges into an arcuate part 18 and the latter terminates in a downwardly extending part 19 which inclines towards the point of joinder between the part 17 and the intermediate portion 14. The part 17, 18 and 19 provide a loop which gradually increases in width from its lower towards its upper end and the function of said loop will be presently referred to. The part 19 at its lower end terminates in the right angularly disposed part 20, which extends inwardly from the lower end of the part 19, and terminates in a loop 21, which is disposed at right angles with respect to the part 20, and provides a pivot for the pintle 22 of a spring controlled roller 23 of known construction. The lower end portion 16 consists of a downwardly extending outwardly inclined part 24 which has its upper end merged into the lower end of the intermediate portion 14. The part 24 terminates in a semi-circular portion 25 and the latter merges into an upwardly extending and inwardly inclined part 26 which abuts against the point of joinder of the part 24 with the portion 14. The part 24, portion 25 and part 26 provides a loop of tapered contour and the function of which will be hereinafter referred to. The part 26 at its upper end terminates in a right angularly disposed part 27 of a length, when the element 12 is secured to the automobile body 1 to extend partly across the window opening 2, see Figure 2. The part 25 provides a pivot for the frame of the awning and which will be hereinafter referred to. The part 27 is peripherally threaded as at 28. The loop formed by the parts 17, 18 and 19, at the upper end of the element 12, is indicated at 29, and the loop formed by the part 24, portion 25 and part 26, at the lower portion of the element 12, is indicated at 30.

The element 13 is constructed in the same manner as the element 12 with this exception that the loop, indicated at 31 and which supports the other pintle 32 of the roller 23 is of the split type so that the pintle 32 can be readily inserted in the loop 31. The loop formed at the upper end of the element 13 is indicated at 33, and the loop at the lower end of the element 13 is indicated at 34. The pivot formed by the part 27 at the lower portion of the element 12 is referred to generally by the reference character 35, and the pivot formed by the right angularly disposed part 36 at the lower end of the element 13 is generally referred to by reference character 37. The intermediate portion of the element 13 is referred to at 38, the upper end portion thereof at 39 and the lower end portion at 40 generally. The elements 12 and 13 are constructed alike other than that the loop 31 is of the split type whereas the loop 21 is of the closed type. The pivots 35 and 37 also constitute supports, and this statement also applies to the loops 21 and 31.

The awning further includes an angularly adjustable carrier for the flexible awning body 41, and the latter is constructed of any suitable material such as canvas or duck and winds on and off the spring controlled roller 23. The inner end of the awning body 41 is connected to the roller 23 and its outer end is secured to the carrier, as at 42, whereby when the awning body 41 winds on the roller 23 the carrier will be carried therewith. The carrier is referred to generally by the reference character 43, and it is in the form of a U-shaped frame comprising an outer arm or head 44 and a pair of side arms 45, 46, and each of which has an enlarged inner end 47 formed with an opening 48 for the passage of a pivot 35 or 37. The carrier 43 can be swung inwardly and outwardly with respect to the pivot 35, 37 and also downwardly so that the awning body 41 will assume the position as shown in dotted lines in Figure 1 and indicated at 49. When swung to the dotted line position it acts as a shade or vertically disposed blind. When the carrier 43 has been adjusted for the purpose of unwinding the body portion 41 from the spring controlled roller 23, it is clamped in its adjusted position to prevent the winding up of the awning body 41. For the purpose of clamping the carrier 43 in adjusted position, the pivot 35, as well as the pivot 37, is provided with means to clamp the carrier from movement and the means on the pivot 35 is the same as that on the pivot 37 and which consists of a nut 50 constituting an abutment, a washer 51, a second washer 52 and a locking nut 53 of the wing type. The enlarged inner end of a side arm of the carrier is positioned between the washers 51 and 52, see Figure 2. The abutment nut 50 is arranged on one side of the washer 51 and in proximity to a side of the opening 2. The clamping nut 53 is arranged at one side of the washer 52 and on the outer end of the pivot. The nuts 50 and 53 and washers 51 and 52 provide means for clamping the carrier 43 in its adjusted position.

The elements 12 and 13 are fixedly secured to the inner face of car body 1 in proximity to the opening 2, by securing devices 54 which extend through the loops 29 and 33, and by securing devices 55 which extend through the loops 25 and 34. When the elements 12 and 13 are secured to the car body 1, they are oppositely disposed with respect to each other. The split loop 31 provides for the connecting of the spring controlled roller 23 in position to extend across the upper end of the opening 2, and the clamping means carried on the pivots 35 and 37 permit of the carrier 43 to be quickly connected with said pivots. When the awning is up, it does not interfere with the shifting of the panel 7 to and from open position with respect to the opening 2. The awning body 41 has its outer end overlapping the arm 44, and with the overlapping portion secured in position by a row of stitching 56, see Figures 1 and 3. When it is not desired to use the awning, the spring controlled roller 23 and carrier 43 can be quickly disconnected from the elements 12 and 13 and stored in a small space.

It is thought that the many advantages of an awning, for the purpose referred to, can be readily understood, particularly in view of its extreme simplicity and convenient adjustability, and although the preferred embodiment of the invention is as illustrated and described, yet it is to be understood that changes in the details of construction can be had which will fall within the scope of the invention as claimed.

What we claim is:

1. In an awning, a combined support and pivot element for a spring controlled roller and an adjustable carrier for a flexible awning body winding on and off said roller, said element having its outer end provided with a loop and a right angularly disposed part at the inner end of the loop terminating in a loop disposed at right angles to the other loop to provide a support for a pintle of the roller, and said element further having its inner end formed with a loop and a right angularly disposed part extending from the inner end of the last mentioned loop and providing a pivot for the carrier.

2. In an awning, a combined support and pivot element for a spring controlled roller and an adjustable carrier for a flexible awning body winding on and off said roller, said element having its outer end provided with a loop and a right angularly disposed part at the inner end of the loop disposed at right angles to the other loop to provide a support for a pintle of the roller, said element further having its inner end formed with a loop, a right angularly disposed part extending from the inner end of the last mentioned loop and providing a pivot for the carrier, the pivot for the carrier being peripherally threaded, and means mounted on said pivot for detachably securing said carrier in adjusted positions.

In testimony whereof, we hereby affix our signatures.

LEO O. STRUBLE.
CHARLES E. HANLY.